Patented June 3, 1924.

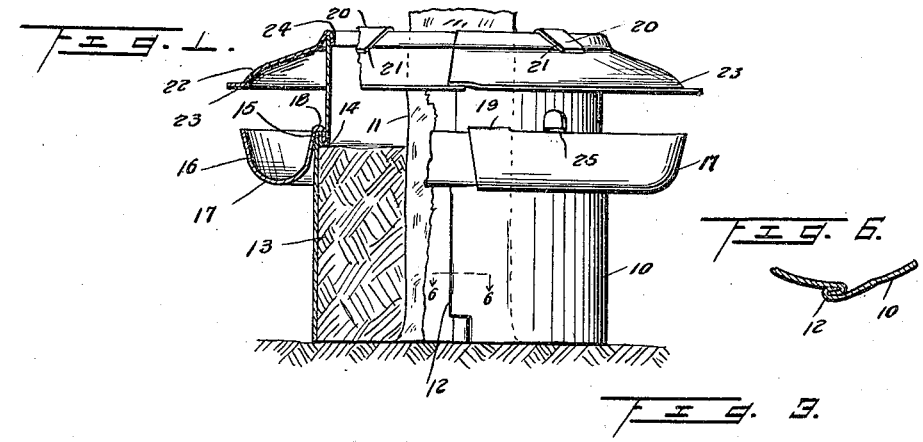
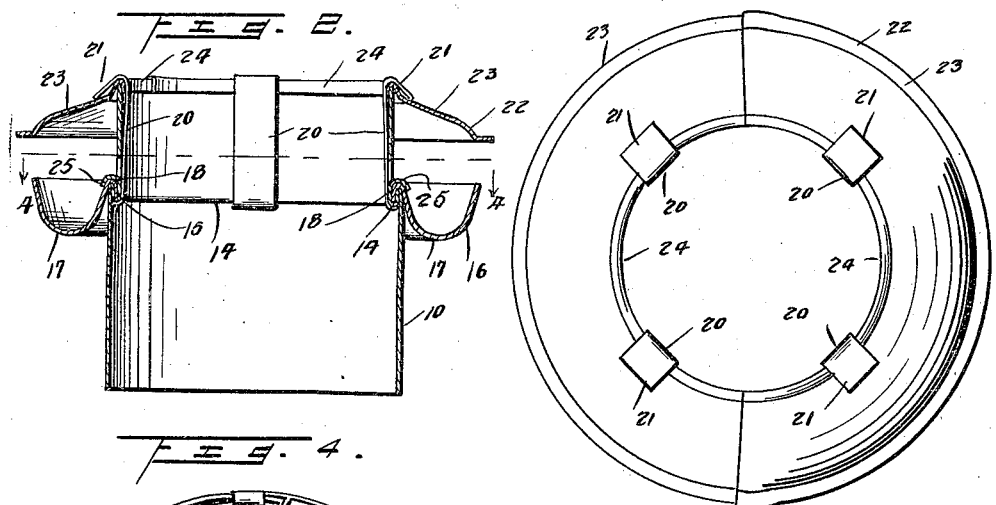
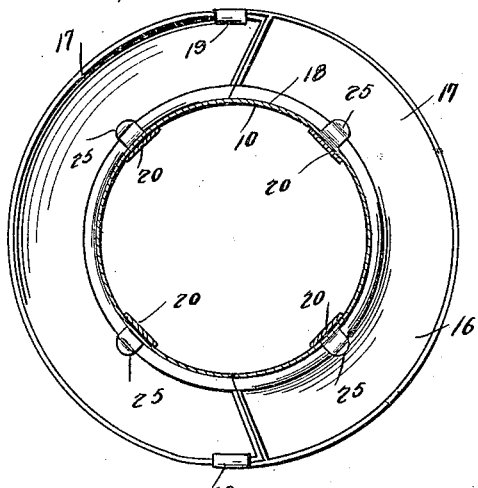
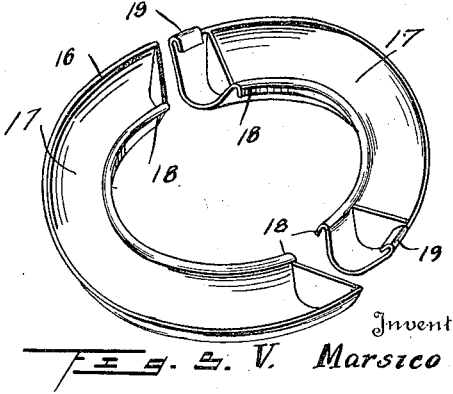

1,496,720

UNITED STATES PATENT OFFICE.

VINCENZO MARSICO, OF WATTS, CALIFORNIA.

TREE PROTECTOR.

Application filed February 8, 1923. Serial No. 617,782.

*To all whom it may concern:*

Be it known that I, VINCENZO MARSICO, a citizen of the United States, residing at Watts, in the county of Los Angeles and State of California, have invented certain new and useful Improvements in Tree Protectors; and I do hereby declare the following to be a full, clear, and exact description of the invention, such as will enable others skilled in the art to which it appertains to make and use the same.

This invention relates to a tree protector and constitutes an improvement in the form of that disclosed in Letters Patent No. 1,323,891, issued to me on December 2, 1919.

The present invention aims to provide a more efficient and generally improved protector, particularly one which employs a novel guard in connection therewith to prevent the liquid used from being washed out and diluted by rain and protect such liquid against the entrance of foreign matter.

It is further aimed to provide novel detachable mountings for and connections between the trough, collar and guard, and which will be specifically pointed out hereinafter as the description progresses with relation to accompanying drawings illustrating an operative embodiment.

In said drawings:—

Figure 1 is a view showing the protector in place about a tree and partly broken away;

Figure 2 is a vertical sectional view through the protector;

Figure 3 is a plan view of the protector;

Figure 4 is a horizontal sectional view on the line 4—4 of Figure 2 taken on a plane intermediate the trough and guard and looking toward the former, Figure 5 is a perspective view of the trough detached, and Figure 6 is a detail sectional view taken on the line 6—6 of Figure 1.

Like reference characters designate like or similar parts in the different views.

In reducing the invention to practice, a suitable collar is provided as at 10 of any suitable height, and adapted to be disposed about the trunk of a tree 11. Application and removal of the collar to the tree trunk is permissible as the collar is of the split type, having its ends secured together as through the engagement of hooked flanges 12 at the ends thereof and integral therewith. Said collar is preferably made of sheet metal and adapted to rest on the ground and partially filled about the trunk of the tree 11 with soil as at 13, but if desired, the collar may be sunk into the ground to a desired depth.

Before being curled into cylindrical form, collar 10 is shortened and gathered as at 14 in order to provide an annular groove 15 about the exterior of the same.

A trough 16 is adapted to surround the collar 10 and may be made in separable sections 17. Each section is substantially U-shaped in cross section as shown and the inner marginal edge has a depending hook flange 18 removably disposed in said groove 15. The ends of the sections 17 are adapted to overlap each other as shown and one of the sections has lugs 19, integral therewith, which are bendable over and adapted to be clinched against the other section. This trough may contain crude oil or any other agent which serves as a barrier to prevent ants, red spiders, snails, scale, steeled moths and the like from crawling up the tree 11. In the position shown, the trough is disposed at a distance above the ground so as to be inaccessible to the parasites. The joints between sections 17 where they overlap, may be rendered leak or waterproof in any desired manner. When it is not desired to have such sections detachable, the said joints may be rendered waterproof by soldering.

Clinched in place in the seam of the gathering at 14, are a plurality of fastening tongues 20 which have terminal hooks 21 extending outwardly over the upper edge of the collar 10.

A guard plate generally of annular form is provided at 22 which is preferably made in separable sections 23, each overlapping the other at its ends, and each provided with a downwardly extending hook flange 24 at its inner edge which hooks over the upper edge of the collar 10 and which sections 23 are adapted to be overlapped and maintained in place by the hook 20. The guard plate 22 is spaced a slight distance above the trough 16 so that the parasites will enter the trough and the guard plate also perferably projects outwardly farther than the trough 16. Such guard plate serves to prevent water from entering the trough and also to prevent foreign matter from entering it.

It is to be understood that the trough 16, guard plate 22 and tongues 20 are made of sheet metal and from the same material as the collar 10.

The barrier agent instead of being crude oil as suggested may be any other suitable material.

In order to better maintain the sections 17 of the trough in place and particularly the flanges 18 in the groove 15, securing tabs 25 are at suitable intervals struck outwardly from the collar 10 and bent and clinched over said sections 17 in line with the flanges 18.

As a result of this construction it will be seen that the insects in endeavoring to travel up the trunk of the tree from the ground, will be forced to cross the trough 16 and in its passage will fall into the crude oil or other agent therein and be killed thereby or else depart from adjacent the tree.

As merely one operative embodiment has been illustrated and described, it is to be understood that changes in the details may be resorted to provided they fall within the spirit and scope.

I claim as my invention:—

1. A tree protector including a collar to surround the tree provided with a groove, and a trough for a barrier agent surrounding said collar having a fastening flange located in said groove, and means integral with the collar overlapping said trough to prevent disengagement of said flange and groove.

2. A tree protector including a collar to surround a tree, said collar being gathered intermediate its ends to provide a groove, and a trough for a barrier agent surrounding said collar fastened in said groove.

3. A tree protector including a collar to surround a tree, said collar being gathered intermediate its ends to provide a groove, and a trough for a barrier agent surrounding said collar fastened in said groove, a guard plate over said trough, and securing means for said guard plate clinched in the gather of said collar.

4. A tree protector including a collar to surround a tree, a trough for a barrier agent surrounding said collar and supported thereon, and said collar having struck out tabs to prevent displacement of said trough.

5. A tree protector including a collar to surround a tree, said collar being gathered intermediate its ends to provide a groove, a trough for a barrier surrounding said collar and supported in said groove, guard plates over said trough having a flange hooked to said collar, and fastening tongues for said guard plates clinched to the collar in the gather.

6. A tree protector having a collar of the split type to surround a tree, said collar being gathered intermediate its ends to provide a groove, a sectional trough surrounding said collar and adapted to contain a barrier agent, the sections of said trough having hook flanges disposed in said groove, the ends of said sections overlapping, certain of said ends having lugs clinched over the other end, struck out tabs on said collar overlapping said sections to prevent displacement of said flanges from said grooves, a sectional collar plate above said trough, said sections of the collar plate having hooked flanges engaging the upper end of the collar, and fastening tongues for said guard plate secured to the collar by said gather.

In testimony whereof I affix my signature in presence of two witnesses.

VINCENZO MARSICO.

Witnesses:
WILLIAM J. HUNSAKER,
JOHN N. CRAMER.